(12) United States Patent
McGhee, Jr. et al.

(10) Patent No.: US 10,875,701 B2
(45) Date of Patent: Dec. 29, 2020

(54) GUSSETED DISPENSER PACKAGE FOR WET WIPES

(71) Applicant: Kimberly-Clark Worldwide, Inc., Neenah, WI (US)

(72) Inventors: Willie C. McGhee, Jr., Conway, AR (US); Reed Carlson Eppelheimer, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 197 days.

(21) Appl. No.: 16/065,251

(22) PCT Filed: Dec. 31, 2015

(86) PCT No.: PCT/US2015/068217
§ 371 (c)(1),
(2) Date: Jun. 22, 2018

(87) PCT Pub. No.: WO2017/116453
PCT Pub. Date: Jul. 6, 2017

(65) Prior Publication Data
US 2020/0148457 A1    May 14, 2020

(51) Int. Cl.
*B65D 81/24* (2006.01)
*B65D 30/20* (2006.01)
(Continued)

(52) U.S. Cl.
CPC ........... *B65D 83/0805* (2013.01); *A47K 7/00* (2013.01); *A47K 10/42* (2013.01); *B65D 65/38* (2013.01); *B65D 83/0894* (2013.01)

(58) Field of Classification Search
CPC .......................... B65D 65/38; B65D 83/0805; B65D 83/0894; A47K 7/00; A47K 10/42; A47K 2010/3266
(Continued)

(56) References Cited

U.S. PATENT DOCUMENTS 3,089,635 A * 5/1963 Kugler ............... B65D 33/02
                                                                383/9
3,147,903 A    9/1964 Lipschutz et al.
(Continued)

FOREIGN PATENT DOCUMENTS

EP    0074161 A2    3/1983
EP    2692648 A1    2/2014
(Continued)

OTHER PUBLICATIONS

"Dongguan Songhui Packaging Material Co. Ltd., Side gusset wet tissue bag/Plastic moist wipes bag/Wet tissue packing bag, http://songhuipackaging.en.alibaba.com/".
(Continued)

*Primary Examiner* — Luan K Bui
(74) *Attorney, Agent, or Firm* — Kimberly-Clark Worldwide, Inc.

(57) ABSTRACT

A package of moist wipes includes a substantially water-vapor impervious flexible film sheet surrounding the moist wipes, and the flexible film sheet defines an inner surface and an outer surface. The package includes at least one seam in which the flexible film is bonded to itself via energy. The seam includes an inner-surface-to-inner-surface energy bonded portion and an outer-surface-to-outer-surface energy bonded portion. In particular embodiments, a top wall is tucked toward a bottom wall adjacent the two side walls to define gusset portions. The top wall can include a resealing mechanism adapted to cover a dispensing orifice.

14 Claims, 7 Drawing Sheets

(51) Int. Cl.
  *B65D 83/08* (2006.01)
  *A47K 7/00* (2006.01)
  *A47K 10/42* (2006.01)
  *B65D 65/38* (2006.01)

(58) Field of Classification Search
  USPC ........ 206/205, 210, 233; 383/107, 114, 115, 383/120, 123, 124, 204
  See application file for complete search history.

(56) References Cited

U.S. PATENT DOCUMENTS

| | | | | |
|---|---|---|---|---|
| 3,300,120 | A * | 1/1967 | Mccolgan | B65D 33/14 383/9 |
| 4,185,754 | A * | 1/1980 | Julius | A47K 10/421 206/210 |
| 4,638,913 | A * | 1/1987 | Howe, Jr. | B65D 75/5855 206/484 |
| 5,582,294 | A | 12/1996 | Yamada | |
| 5,791,465 | A | 8/1998 | Niki | |
| 5,862,652 | A * | 1/1999 | Schoeler | B65B 9/2042 493/302 |
| 6,065,591 | A | 5/2000 | Dill | |
| 6,113,271 | A | 9/2000 | Scott | |
| 6,164,821 | A | 12/2000 | Randall | |
| 6,572,267 | B1 * | 6/2003 | Forman | B29C 65/56 383/61.2 |
| 6,702,109 | B1 * | 3/2004 | Tabuchi | B65D 75/5838 206/233 |
| 6,820,391 | B2 | 11/2004 | Barmore | |
| 7,416,083 | B2 * | 8/2008 | Bando | A47K 10/421 206/210 |
| 7,631,761 | B2 | 12/2009 | Gradzewicz | |
| 8,262,830 | B2 | 9/2012 | Hebert | |
| 8,424,683 | B2 | 4/2013 | Fryer | |
| 8,545,099 | B2 | 10/2013 | Davis | |
| 2003/0077010 | A1 * | 4/2003 | Schulz | B65D 75/008 383/66 |
| 2006/0151518 | A1 | 7/2006 | Sarbo | |
| 2011/0058755 | A1 | 3/2011 | Guibert | |
| 2011/0103720 | A1 | 5/2011 | De Muinck | |
| 2011/0147401 | A1 | 6/2011 | Rubo | |
| 2012/0090275 | A1 * | 4/2012 | Uchida | A61K 31/4045 53/473 |
| 2012/0152974 | A1 | 6/2012 | Gordon | |
| 2012/0312713 | A1 | 12/2012 | Bando | |
| 2013/0279833 | A1 | 10/2013 | Wallander | |
| 2014/0001196 | A1 | 1/2014 | Bushman | |
| 2014/0374432 | A1 | 12/2014 | Bechyne | |
| 2014/0374435 | A1 | 12/2014 | Thoresen | |

FOREIGN PATENT DOCUMENTS

| | | |
|---|---|---|
| JP | 2258561 A2 | 10/1990 |
| WO | WO08055962 A1 | 5/2008 |

OTHER PUBLICATIONS

Huggies Wipes packaging, photographed Nov. 23, 2015 view 1.
Huggies Wipes packaging, photographed Nov. 23, 2015 view 2.
Huggies Wipes packaging, photographed Nov. 23, 2015 view 3.
Huggies Wipes packaging, photographed Nov. 23, 2015 view 4.
Huggies Wipes packaging, photographed Nov. 23, 2015 view 5.
Huggies Wipes packaging, photographed Nov. 23, 2015 view 6.
Huggies Wipes packaging, photographed Nov. 23, 2015 view 7.
Huggies Wipes packaging, photographed Nov. 23, 2015 view 8.
Huggies Wipes packaging, photographed Nov. 23, 2015 view 9.
Huggies Wipes packaging with rigid flip top, photographed Nov. 23, 2015 view 1.
Huggies Wipes packaging with rigid flip top, photographed Nov. 23, 2015 view 2.
Huggies Wipes packaging with rigid flip top, photographed Nov. 23, 2015 view 3.
Huggies Wipes packaging with rigid flip top, photographed Nov. 23, 2015 view 4.
Huggies Wipes packaging with rigid flip top, photographed Nov. 23, 2015 view 5.
Huggies Wipes packaging with rigid flip top, photographed Nov. 23, 2015 view 6.
Huggies Wipes packaging with rigid flip top, photographed Nov. 23, 2015 view 7.
Huggies Little snugglers diapers packaging, photographed Nov. 23, 2015 view 1.
Huggies Little snugglers diapers packaging, photographed Nov. 23, 2015 view 2.
Huggies Little snugglers diapers packaging, photographed Nov. 23, 2015 view 3.
Huggies Little snugglers diapers packaging, photographed Nov. 23, 2015 view 4.
Huggies Little snugglers diapers packaging, photographed Nov. 23, 2015 view 5.
Huggies Little snugglers diapers packaging, photographed Nov. 23, 2015 view 6.
Huggies Little snugglers diapers packaging, photographed Nov. 23, 2015 view 7.
Huggies Little snugglers diapers packaging, photographed Nov. 23, 2015 view 8.
Huggies Little snugglers diapers packaging, photographed Nov. 23, 2015 view 9.
Overwrapped bundle of Huggies wipes, photographed Nov. 25, 2015 view 1.
Overwrapped bundle of Huggies wipes, photographed Nov. 25, 2015 view 2.
Overwrapped bundle of Huggies wipes, photographed Nov. 25, 2015 view 3.
Overwrapped bundle of Huggies wipes, photographed Nov. 25, 2015 view 4.
Overwrapped bundle of Huggies wipes, photographed Nov. 25, 2015 view 5.
Overwrapped bundle of Huggies wipes, photographed Nov. 25, 2015 view 6.
Overwrapped bundle of Huggies wipes, photographed Nov. 25, 2015 view 7.

* cited by examiner

GUSSETED DISPENSER PACKAGE FOR WET WIPES

BACKGROUND OF THE DISCLOSURE

Premoistened wipes are sold for many applications, including diapering, toileting, surface cleaning, disinfecting, and the like. Such wipes are premoistened with a liquid solution suitable for the purpose at hand, such as cleaning or disinfecting skin or hard surfaces. One consumer-preferred format in which to purchase such wipes is in a package which not only stores and keeps the wipes moist, but also functions as a dispenser. Such packages must keep the wipes moist by preventing evaporation of the liquid solution in which the wipes are soaked.

A first conventional approach to providing such packages is to supply a refillable rigid dispensing tub or dispensing container with wipes therein. Many such dispensers provide desirable "pop-up" dispensing. When the dispenser is empty, "refill" bags of wipes are provided, and consumers can take wipes from the refill bag and replenish the depleted supply of wipes in the dispenser. An example of a conventional refill bag is shown in Figs. A and B. The example shown includes a resealable, "press and seal" seam 1 at the top of the bag. A second conventional approach to providing such packages is to supply a flexible film package having a dispensing orifice that can be repeatedly opened and closed. These are sometimes referred to as "peel and seal" disposable pouch dispensers or "rigid flip top" disposable pouch dispensers. An example of a conventional disposable pouch dispenser is shown in FIG. 13. The flexible film (typically plastic) used to construct both refill bags and disposable pouch dispensers typically must have two properties—the film must keep the wipes moist, and the film must be adapted to be sealed to itself to form the seams of the bag.

Two regions of a film made from certain common polymers, such as low-density polyethylene, can be readily bonded to each other using energy such as heat, pressure, or ultrasonic energy. However, such polymers do not provide the requisite level of moisture imperviousness. Other polymers, such as high-density polyethylene, deliver a film that has excellent moisture imperviousness, but cannot be readily bonded to itself to create seams to form an enclosure. As a result, it is common to form films having two layers—a layer to provide self-sealability to form seams, and a layer to provide the requisite moisture-imperviousness.

In one common execution, a film has a low-density polyethylene (LDPE) layer and a high-density polyethylene (HDPE) layer. The LDPE layer typically faces the interior of the bag or pouch so that inwardly-facing regions of the film can be bonded to each other to form the side seal 2, the bottom seal 3, and the end seals 4, 5, as shown in Figs. A-C. The HPDE layer typically faces away from the interior, and provides the requisite moisture-imperviousness.

The disposable pouch dispenser made by a "flow-wrap" process and shown in FIG. 13 works well as a dispenser, because the top face 7, being relatively flat, functions effectively as a dispensing wall having a dispensing orifice. In a common configuration, the dispensing orifice is surrounded by a rigid flip top 9. The refill bag of Figs. A-B, while useful to house a large quantity of wipes, is ill-suited to function as a dispenser, because it lacks a flat, smooth face on the top or bottom, which is generally aligned with the top and bottom of the stack of wipes housed therein if dispensing functionality is desired.

A type of bag common for use with dry products, such as diapers, is the "gusset" bag, an example of which is shown in FIG. 14. In such a bag, certain panels (such as the top panel 10 in the example of FIG. 14) is "tucked in" at the ends and sealed into the side seams 11, 12. Gusset bags can provide an aesthetically pleasing generally parallelepiped geometry, and provide relatively flat, smooth faces on the top and bottom of the bag. However, due to the tucked portions, the film from which gusset bags are formed includes both inner-surface-to-inner-surface bonding and outer-surface-to-outer-surface bonding. Accordingly, the bi-layer LDPE/HDPE film described above is not suitable. Instead, gusset bags are constructed of a monolayer film that can be bonded to itself on both surfaces (such as LDPE). As noted above, such polymers do not provide the requisite moisture-imperviousness.

What is needed in the art is a technique to make self-dispensing, moisture-impervious, gusset-style bags for storing moist wipes.

SUMMARY OF THE DISCLOSURE

In a first embodiment, the invention provides a package of moist wipes that includes a flexible film sheet surrounding the moist wipes, and the flexible film sheet defines an inner surface and an outer surface. The package includes at least one seam in which the flexible film is bonded to itself via energy. The seam includes an inner-surface-to-inner-surface energy bonded portion and an outer-surface-to-outer-surface energy bonded portion. The flexible film sheet is substantially water-vapor impervious.

In a second embodiment, the invention provides the package of the first embodiment wherein the outer-surface-to-outer-surface energy bonded portion is sandwiched between two inner-surface-to-inner-surface energy bonded portions.

In a third embodiment, the invention provides the package of the first or second embodiments wherein the package includes a line of weakness that defines a removable portion, wherein the line of weakness comprises a plurality of score lines that penetrate a depth that is less than a thickness of the flexible film sheet.

In a fourth embodiment, the invention provides the package of any of the first, second, and third embodiments wherein the package includes a rigid flip top assembly adapted to cover a dispensing orifice, the assembly comprising a rigid ring affixed to the flexible film sheet and a lid hingedly attached to the rigid ring.

In a fifth embodiment, the invention provides the package of any of the first through fourth embodiments wherein the flexible film sheet comprises a middle layer made of a first polymer sandwiched between top and bottom layers made of a second polymer, the second polymer suitable for energy bonding to itself and the first polymer not suitable for energy bonding to itself.

In a sixth embodiment, the invention provides the package of the fifth embodiment wherein the first polymer is high-density polyethylene and wherein the second polymer is low-density polyethylene.

In a seventh embodiment, the invention provides a package of moist wipes that includes a flexible film sheet surrounding the moist wipes, and the flexible film sheet defines an inner surface and an outer surface. The package has a generally parallelepiped shape, a first side wall opposite a second side wall, a front wall opposite a back wall, and a top wall opposite a bottom wall, and each wall is formed from the flexible film sheet. The top wall is tucked toward the bottom wall adjacent the first side wall to define a first gusset portion, and the top wall is tucked toward the bottom wall adjacent the second side wall to define a second gusset portion. The flexible film sheet is substantially water-vapor impervious. The top wall includes a resealing mechanism adapted to cover a dispensing orifice.

In an eighth embodiment, the invention provides the package of the seventh embodiment wherein the resealing mechanism comprises a rigid flip top assembly, the assembly comprising a rigid ring affixed to the flexible film sheet, and a lid hingedly attached to the rigid ring.

In a ninth embodiment, the invention provides the package of the seventh or eighth embodiments wherein the top wall includes a line of weakness that defines a removable film portion adapted to be removed to define the dispensing orifice, wherein the line of weakness comprises a plurality of score lines that penetrate a depth that is less than a thickness of the flexible film sheet.

In a tenth embodiment, the invention provides a package of moist wipes that includes a flexible film sheet surrounding the moist wipes, and the flexible film sheet defines an inner surface and an outer surface. The package has a generally parallelepiped shape, and has a first side wall opposite a second side wall, a front wall opposite a back wall, and a top wall opposite a bottom wall, and each wall is formed from the flexible film sheet. The flexible film sheet is bonded to itself along opposite first and second side seams to form the first and second side walls, respectively. The top wall is tucked toward the bottom wall adjacent the first and second side walls to define first and second gusset portions, respectively. The first and second gusset portions are held in place by the first and second side seams, respectively, via first and second W-fold bonded regions, respectively. Each W-fold bonded region includes an outer-surface-to-outer-surface gusset bond sandwiched between two inner-surface-to-inner-surface gusset bonds. A region of each side seam that is below the respective gusset portion includes an inner-surface-to-inner-surface side bond. Each of the bonds is an energy bond. The flexible film is substantially water-vapor impervious.

In an eleventh embodiment, the invention provides a package of moist wipes that includes a flexible film sheet surrounding the moist wipes, and the flexible film sheet defines an inner surface and an outer surface. The package has a generally parallelepiped shape, and has a first side wall opposite a second side wall, a front wall opposite a back wall, and a top wall opposite a bottom wall, and each wall is formed from the flexible film sheet. The flexible film sheet is bonded to itself along a first side seam to form the first side wall, and bonded to itself along a second side seam to form the second side wall. The top wall is tucked toward the bottom wall adjacent the first side wall to define a first gusset portion, and the top wall is tucked toward the bottom wall adjacent the second side wall to define a second gusset portion. The first gusset portion is held in place by the first side seam via a first W-fold bonded region that comprises an outer-surface-to-outer-surface bond sandwiched between two inner-surface-to-inner-surface bonds. A region of the first side seam that is below the first gusset portion comprises an inner-surface-to-inner-surface bond. The second gusset portion is held in place by the second side seam via a second W-fold bonded region that comprises an outer-surface-to-outer-surface bond sandwiched between two inner-surface-to-inner-surface bonds. A region of the second side seam that is below the second gusset portion comprises an inner-surface-to-inner-surface bond. Each bond is an energy bond. The flexible film sheet is substantially water-vapor impervious.

In a twelfth embodiment, the invention provides the package of the tenth or eleventh embodiments wherein the top wall includes a line of weakness that defines a removable film portion.

In a thirteenth embodiment, the invention provides the package of the twelfth embodiment wherein the line of weakness comprises a plurality of score lines that penetrate a depth that is less than a thickness of the flexible film sheet.

In a fourteenth embodiment, the invention provides the package of any of the tenth through thirteenth embodiments wherein the top wall includes a rigid flip top assembly adapted to cover a dispensing orifice, the assembly comprising a rigid ring affixed to the flexible film sheet, and a lid hingedly attached to the rigid ring.

In a fifteenth embodiment, the invention provides the package of any of the seventh through fourteenth embodiments wherein the flexible film sheet is bonded to itself along a bottom seam to form the bottom wall, at least a portion of the bottom seam comprising an inner-surface-to-inner-surface bond.

In a sixteenth embodiment, the invention provides the package of the fifteenth embodiment wherein at least a portion of the bottom seam includes an outer-surface-to-outer-surface bond, and wherein the outer-surface-to-outer-surface bond of the bottom seam is sandwiched between two inner-surface-to-inner-surface bottom seam bonds.

In a seventeenth embodiment, the invention provides the package of any of the seventh through sixteenth embodiments wherein the flexible film sheet comprises a middle layer made of a first polymer sandwiched between top and bottom layers made of a second polymer that is different than the first polymer.

In an eighteenth embodiment, the invention provides the package of the seventeenth embodiment wherein the first polymer is high-density polyethylene, and wherein the second polymer is low-density polyethylene.

In a nineteenth embodiment, the invention provides the package of any of the first through eighteenth embodiments wherein the flexible film sheet has a water vapor transmission rate of less than 2 grams per square inch per day.

DETAILED DESCRIPTION OF THE DISCLOSURE

Figure 1:
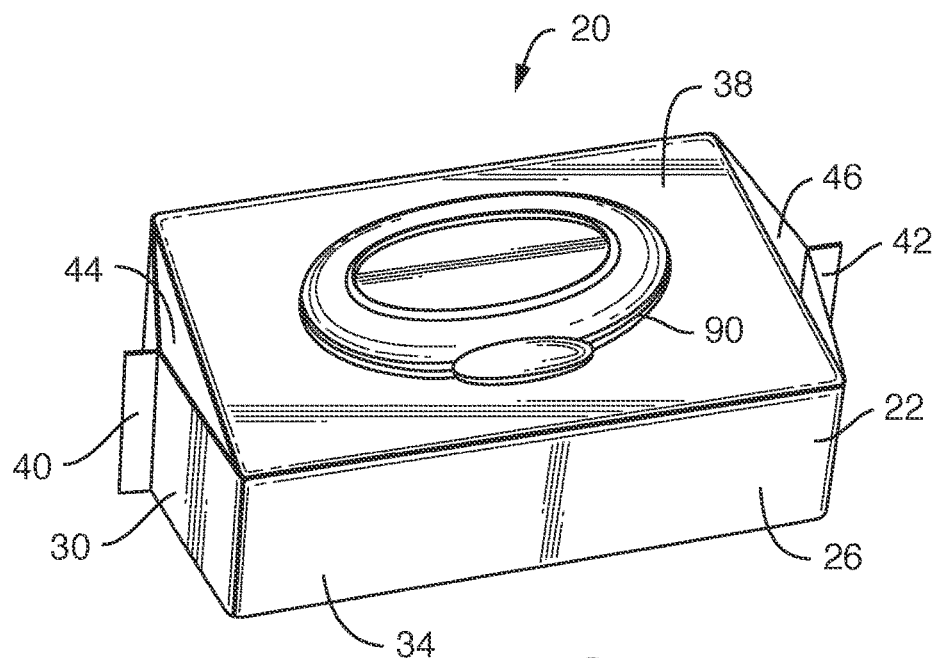
FIG. 1 is a perspective view of one embodiment of a package of moist wipes of the invention.

As used herein, "flexible" means a non-foamed polymeric film with a thickness of about 250 micrometers or less or a foamed polymeric film with a thickness of about 2000 micrometers or less.

As used herein, "rigid" means a level of stiffness commonly associated with materials used to manufacture wet wipes tubs or parts thereof. Numerically, these materials typically have a flexural modulus (as measured in accordance with ASTM D790 "Standard Test Method for Flexural Properties of Unreinforced and Reinforced Plastics and Electrical Insulating Materials") of about 100 Newtons per square millimeter or greater, more specifically from about 1100 to about 1550 Newtons per square millimeter.

Referring to FIGS. 1-10, In particular embodiments, the present invention is directed to a package 20 of moist wipes 18. The package includes a flexible film sheet 22 that surrounds the moist wipes 18. The flexible film sheet 22 is substantially water-vapor impervious. In particular embodiments, the flexible film sheet 22 has a Water Vapor Transmission Rate (WVTR) of less than two grams per square inch per day (24 hours), and more particularly less than one gram per square inch per day. WVTR may be measured according to American Society for Testing and Materials Standard Method ASTM F 1249 entitled "Test Method for Water Vapor Transmission Rate Through Plastic Film and Sheeting Using a Modulated Infrared Sensor." In a method, a gas with known temperature and water content is placed on one side of a film, and the water content is measured on the opposite side of the film. "Water Vapor Transmission Rate" (WVTR) as used herein means the WVTR obtained via ASTM F 1249, using a gas on the "wet" side of the film sheet having 90 percent relative humidity and a temperature of 38 degrees Celsius.

The flexible film sheet 22 defines an inner surface 24 and an outer surface 26. "Inner surface" as used herein means the surface of the film that primarily faces the interior of the package. The majority of the interior surface will in particular embodiments be capable of contacting the moist wipes 18 housed within the package 20. "Outer surface" as used herein means the surface of the film that primarily faces away from the interior of the package. Due to folds and seams in the flexible film sheet 22 as shall be described below, it is contemplated that not all sections of the "inner surface" will face the interior of the package; rather, "inner surface" and "outer surface" are merely a convention to refer to the two opposing surfaces of the film sheet 22 when describing the structural features of particular embodiments of the invention.

Figure 4:
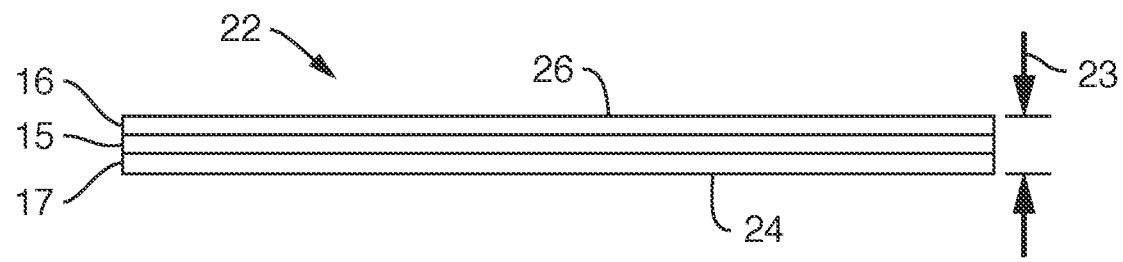
FIG. 4 is a side view of one embodiment of a flexible film sheet suitable for use in conjunction with particular embodiments of the present invention.
Figure 5:
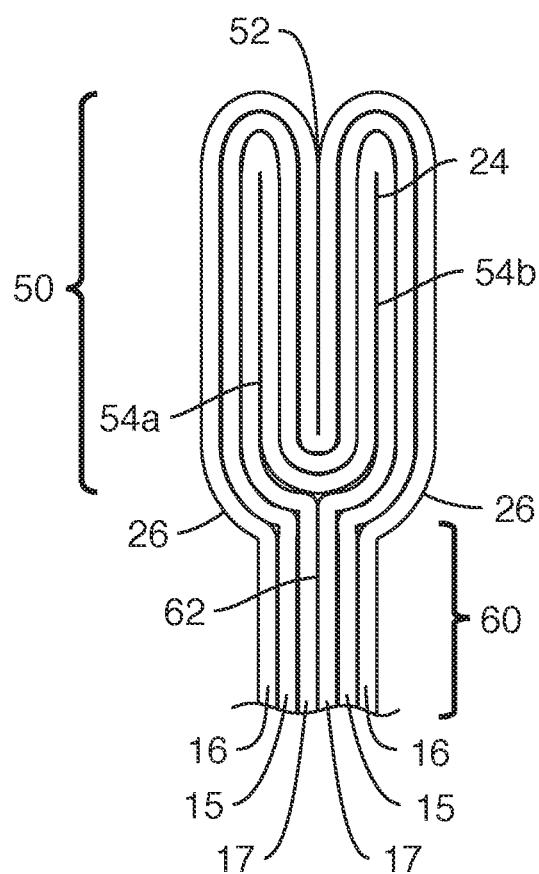
FIG. 5 is a magnified view of the side seam portion labeled "5" in FIG. 2, with the seam thickness exaggerated to show detail.
Figure 6:
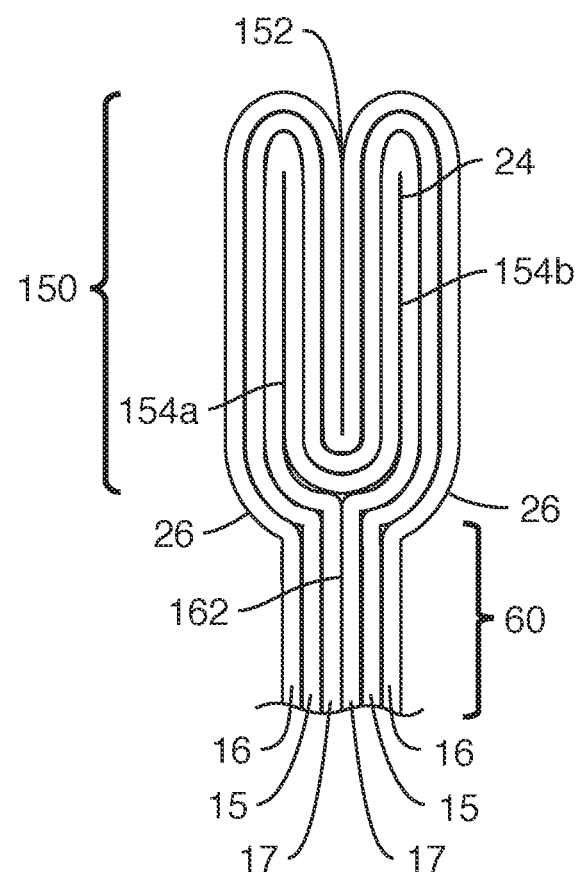
FIG. 6 is a magnified view of the side seam portion labeled "6" in FIG. 3, with the seam thickness exaggerated to show detail.
Figure 7:
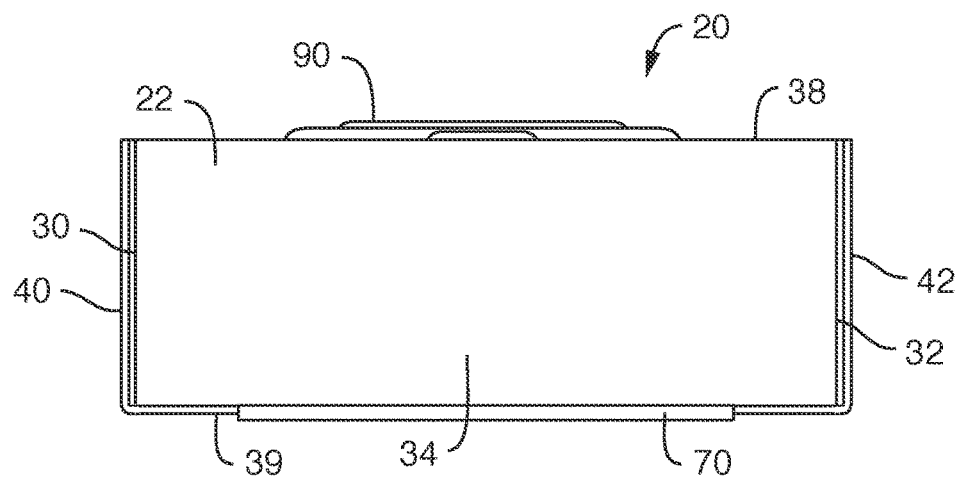
FIG. 7 is a front plan view of the package of FIGS. 1-3.

The flexible film sheet 22 can be constructed of any material that will deliver the unique structural features as set forth in the present disclosure. As shown in FIGS. 4-6, in particular embodiments, the flexible film sheet 22 includes a middle layer 15 made of a first polymer. The middle layer 15 is sandwiched between top and bottom layers 16, 17, both of which are made of a second polymer that is different than the first polymer. The second polymer is present on both surfaces of the film and enables the use of energy bonding to bond different portions of the flexible film sheet 22 to one other. In particular embodiments, the first polymer used for the middle layer 15 is high-density polyethylene, or other polymer with sufficient moisture imperviousness. In particular embodiments, the second polymer used for the top and bottom layers 16, 17 is low-density polyethylene, or other polymer that can readily be sealed to itself using energy. In other embodiments, the top layer 16 is made of a second polymer and the bottom layer 17 is made of a third polymer, and the second polymer is different than the third polymer. However, in such an embodiment, both the second polymer and the third polymer enable the use of energy bonding to bond different portions of the flexible film sheet 22 to one other.

The package 20 has a generally parallelepiped shape. The package 20 has a first side wall 30 opposite a second side wall 32, a front wall 34 opposite a back wall 36, and a top wall 38 opposite a bottom wall 39. Each wall is formed from the flexible film sheet 22.

Referring to FIGS. 1-3 and 7, in particular embodiments, the flexible film sheet 22 is bonded to itself along a first side seam 40 to form the first side wall 30, and is bonded to itself along a second side seam 42 to form the second side wall 32. The top wall 38 is tucked toward the bottom wall 39 adjacent the first side wall 30 to define a first gusset portion 44, and the top wall 38 is tucked toward the bottom wall 39 adjacent the second side wall 32 to define a second gusset portion 46.

Figure 2:
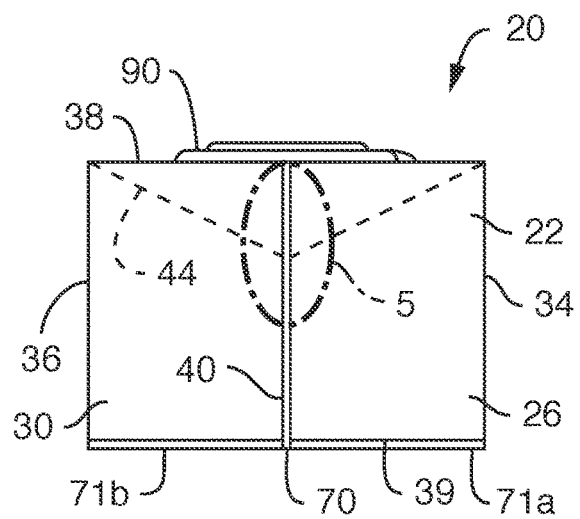
FIG. 2 is a first side view of the package of FIG. 1.
Figure 3:
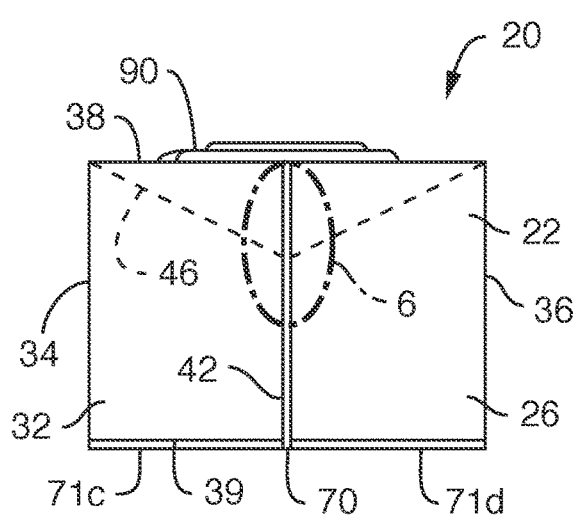
FIG. 3 is a second side view of the package of FIG. 1.

FIGS. 5 and 6 show a close-up view of the manner in which the flexible film sheet 22 is folded and bonded in the regions of the package 20 denoted as "5" in FIG. 2 and "6" in FIG. 3, respectively. In particular embodiments, as shown in FIG. 5, the first gusset portion 44 is held in place by the first side seam 40 via a first W-fold bonded region 50 that comprises an outer-surface-to-outer-surface bond 52 sandwiched between two inner-surface-to-inner-surface bonds 54a, 54b. In particular embodiments, a region 60 of the first side seam 40 that is below the first gusset portion 44 comprises an inner-surface-to-inner-surface bond 62. In similar fashion, as shown in FIG. 6, in particular embodiments, the second gusset portion 46 is held in place by the second side seam 42 via a second W-fold bonded region 150 that comprises an outer-surface-to-outer-surface bond 152 sandwiched between two inner-surface-to-inner-surface bonds 154a, 154b. In particular embodiments, a region 160 of the second side seam 42 that is below the second gusset portion 46 comprises an inner-surface-to-inner-surface bond 162. "Outer-surface-to-outer-surface bond" as used herein means a region where two outer-surface sections of the flexible film sheet 22 contact and are integrally bonded to one another. Similarly, "inner-surface-to-inner-surface bond" as used herein means a region where two inner-surface sections of the flexible film sheet 22 contact and are integrally bonded to one another. "Below" as used in this context means in a direction away from the stated gusset portion, toward the bottom wall 39.

Figure 8:
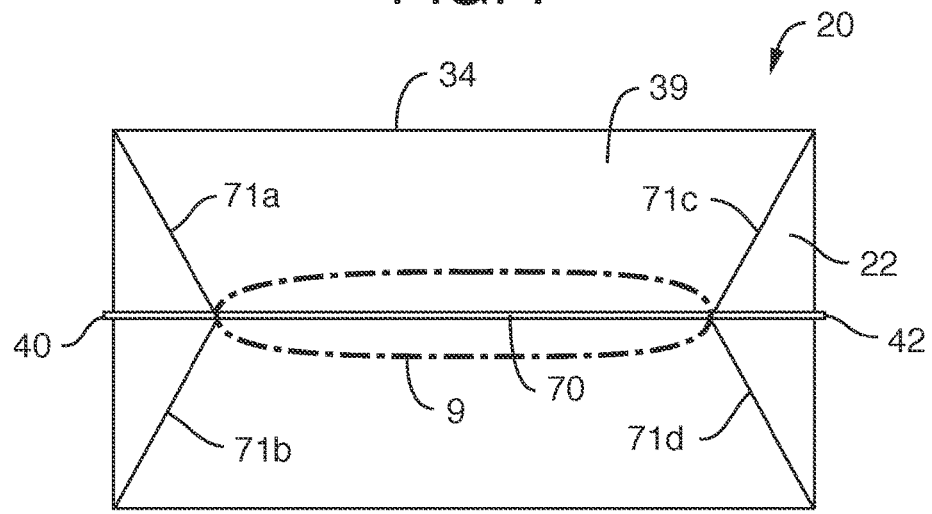
FIG. 8 is a bottom plan view of the package of FIGS. 1-3 and 7.
Figure 9:
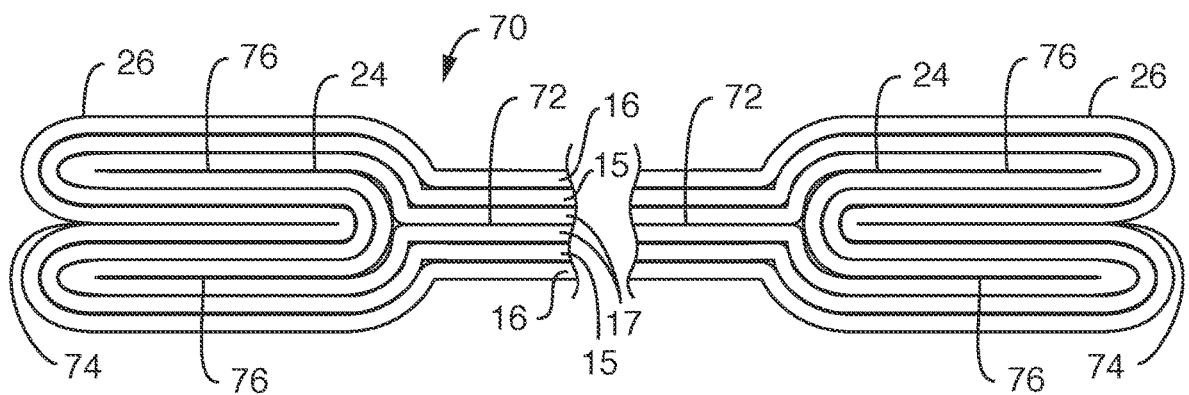
FIG. 9 is a magnified view of the bottom seam portion labeled "9" in FIG. 8, with the seam thickness exaggerated to show detail.

Referring to FIGS. 8 and 9, in particular embodiments, the flexible film sheet 22 is bonded to itself along a bottom seam 70 to form the bottom wall 39. The flexible film sheet 22 is folded and tucked to create folds 71a/71b/71c/71d. At least a portion of the bottom seam 70 comprises an inner-surface-to-inner-surface bond 72. In particular embodiments, at least a portion of the bottom seam 70 includes an outer-surface-to-outer-surface bond 74. The outer-surface-to-outer-surface bond 74 of the bottom seam is sandwiched between two inner-surface-to-inner-surface bottom seam bonds 76, 76.

Desirably, each of the bonds is an energy bond. "Energy bond" as used herein means a bond between two or more sections or regions of film created by integrally melting or smashing the sections or regions together via the application of energy. Examples of energy suitable for such application include heat, ultrasonic, and pressure. When two film surfaces are pressed together and energy is imparted, the two surfaces melt or otherwise integrally intermix together in a compatible fashion if the polymer(s) present in the two surfaces are adapted to deliver such compatible intermixing.

Figure 10:
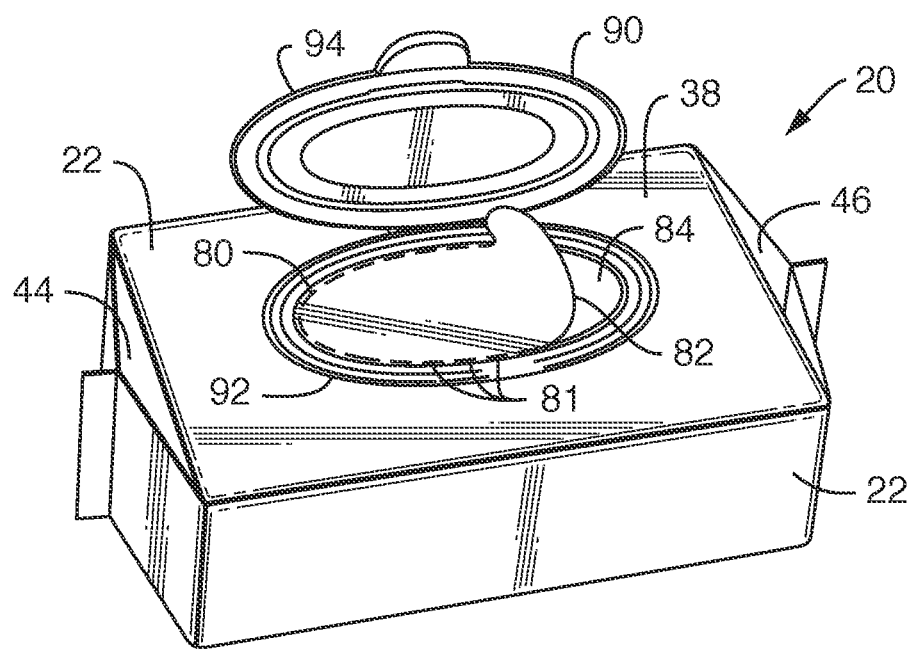
FIG. 10 is the package of moist wipes of claim 1, with the lid open to expose the dispensing orifice.
Figure 11:
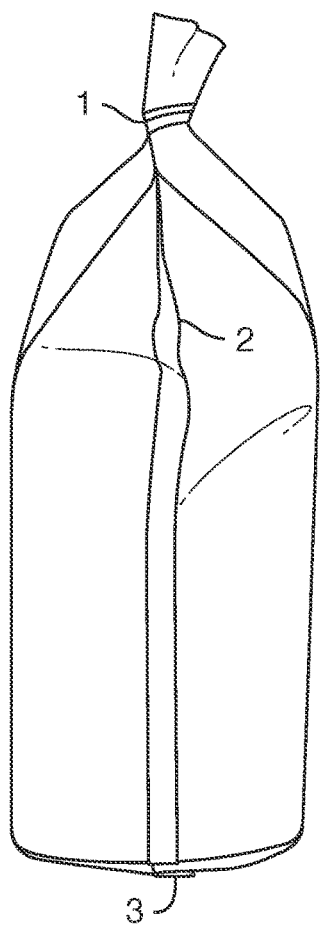
FIG. 11 is side perspective view of a conventional moist wipes refill bag.
Figure 12:
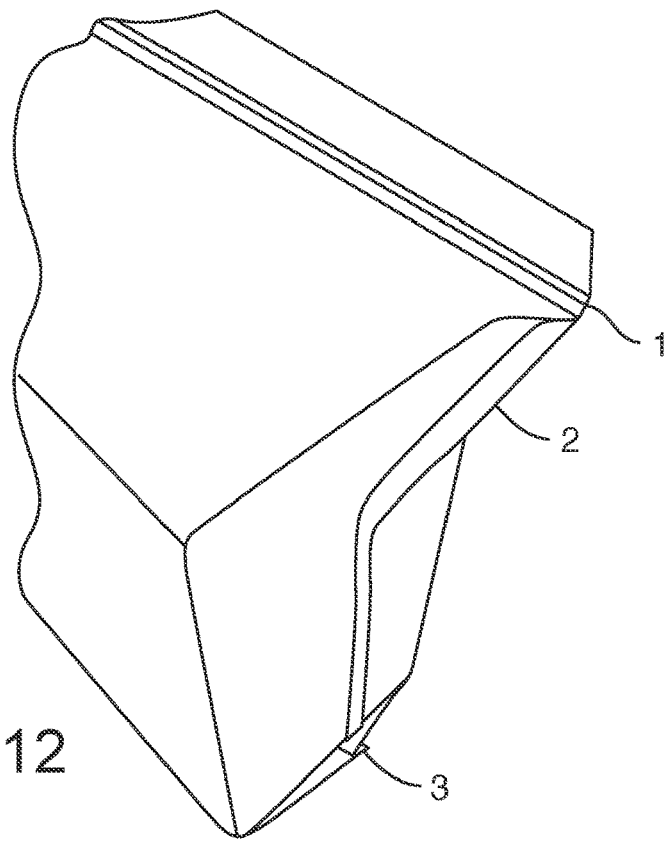
FIG. 12 is a perspective view of one end of the moist wipes refill bag of FIG. 10.
Figure 13:
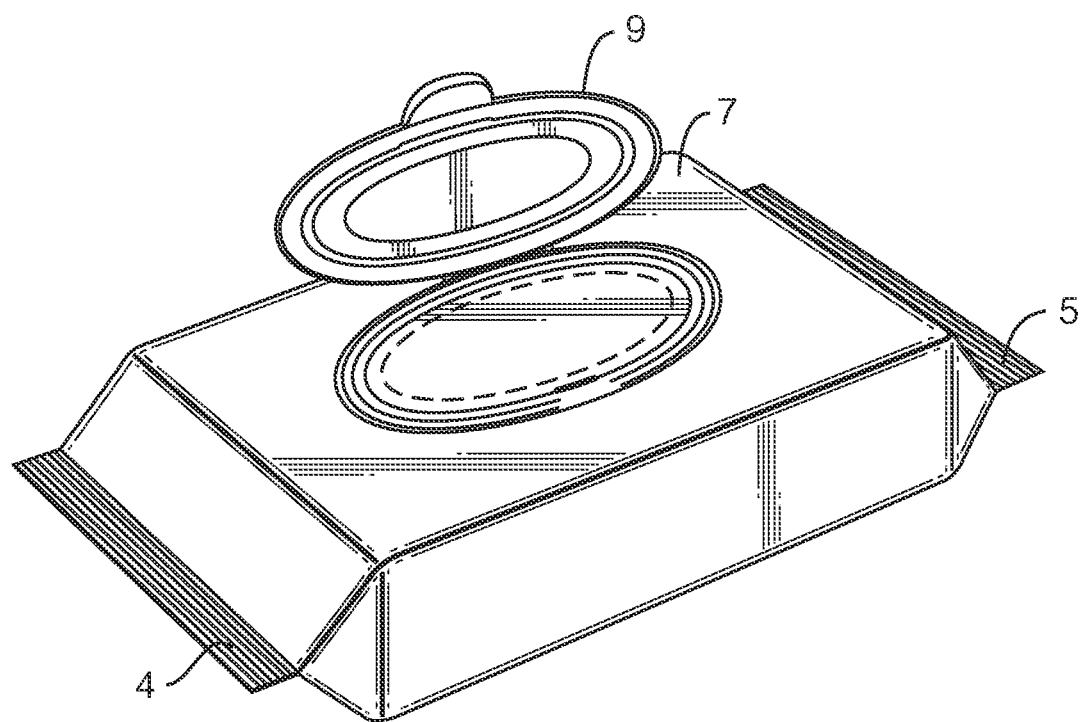
FIG. 13 is a perspective view of conventional "flow wrap," rigid flip-top moist wipes dispenser package.
Figure 14:
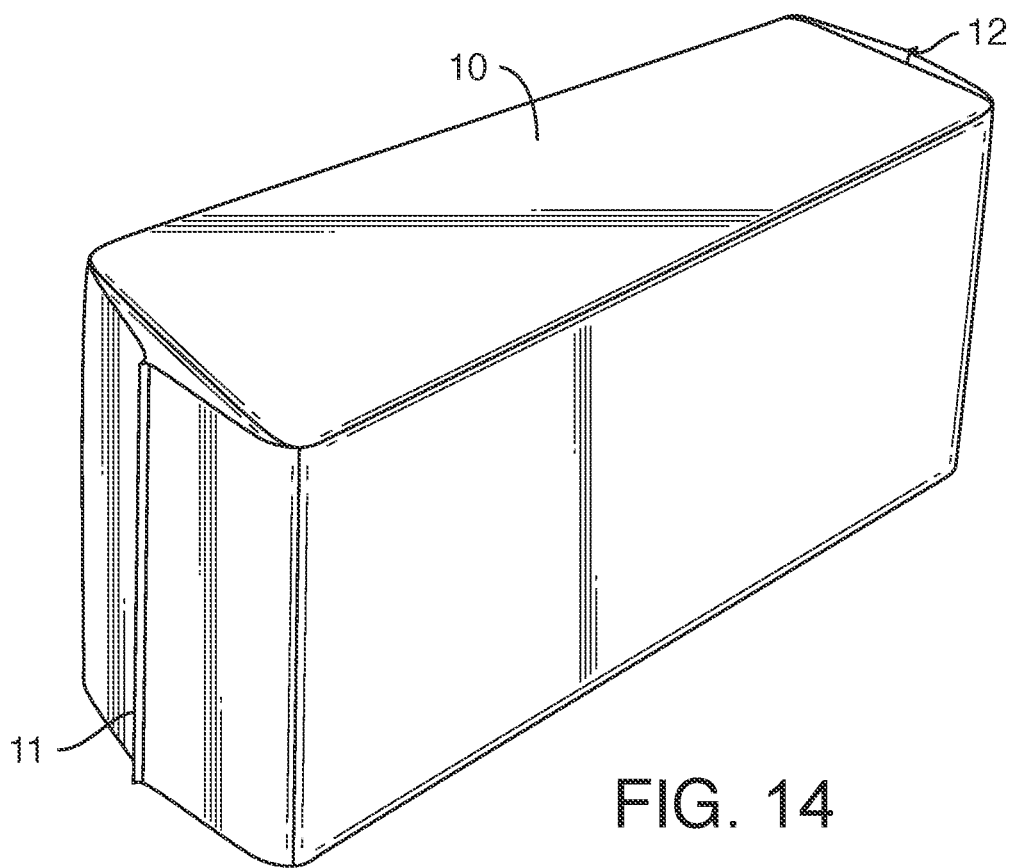
FIG. 14 is a perspective view of a conventional diaper bag.

As shown in FIG. 10, in particular embodiments, the top wall 38 includes a line of weakness 80 that defines a removable film portion 82. The removable film portion 82 can be removed by a consumer to reveal a dispensing orifice 84. In one example, the line of weakness 80 is defined by at least one score line, such as a plurality of score lines 81. Desirably, the score lines penetrate a depth that is less than a thickness 23 of the flexible film sheet 22 (FIG. 4). In this way, the flexible film sheet 22 can maintain its substantially moisture-impervious character until a user removes the removable film portion 82 via the line of weakness 80.

In particular embodiments, one of the walls, such as the top wall 38, includes a resealing mechanism. One example of a resealing mechanism is a semi-rigid "peel and seal" label, as is known in the art. Another example of a resealing mechanism is a rigid flip top assembly 90, as shown in the Figures. The rigid flip top assembly 90 includes a rigid ring 92 affixed to the flexible film sheet 22. The rigid ring 92 surrounds the dispensing orifice 84. The rigid flip top assembly 90 further includes a lid 94 that seals against the ring 92 to cover the dispensing orifice 84. Desirably, the lid 94 is hingedly attached to the rigid ring 92.

The moist wipes can be arranged in the package in any manner which provides convenient and reliable one at a time dispensing and which assists the wipes in not becoming dirty and/or overly dry. For example, the wipes may be arranged in the package as a plurality of individual sheets arranged in a stacked configuration to provide a stack of wipes which may or may not be individually folded. The wipes may be individual wipes which are folded in a c-fold, z-fold, quarter fold or other zigzag fold or interfolded or non-interfolded configurations as are known to those skilled in the art. The wipes may include a plurality of wipes stacked one on top of each other in a non-interfolded configuration, for "reach-in" dispensing. For such a non-interfolded wipe, each wipe is folded onto itself with no portion of another wipe being positioned between or underneath any portion of the folds of the adjacent wipe(s). These configurations for wipes, as well as those discussed herein, may be provided by means known to those skilled in the art.

Alternatively, the individual wipes can be interfolded or in other ways related such that the leading and trailing end edges of successive wipes in the stacked configuration overlap, for "pop-up" dispensing. In such a configuration, the leading end edge of the trailing wipe is loosened from the stack by the trailing end edge of the leading wipe as the leading wipe is removed by the user. The wipes can be interfolded to facilitate such dispensing by means known to those skilled in the art.

Yet alternatively, the wipes can be arranged in the package as a continuous web of interconnected wipes which are folded in an accordion-like stacked configuration. The individual wipes can be connected together along lines of frangibility, such as lines of perforations, to ensure that the trailing wipe is in position for grasping by the user after the leading wipe is removed. For example, the wipes can be provided by a continuous web of material which has a series of lines of frangibility extending across the width of the web. The portion of the web of material between successive lines of frangibility provides each individual wipe. The lines of frangibility can be provided by means known to those skilled in the art such as perforations, indentations, or cuts in the web of material. For example, the lines of frangibility or perforations can be provided in the web of material by passing the web of material between a die cutter roll and anvil roll. After the lines of frangibility have been incorporated into the web of material, the web can then be arranged in a stacked configuration for easy insertion into the pouch during formation thereof.

The package of the present invention can include any suitable number of individual wipes depending upon the desired packaging and end use. Each wipe is, in particular embodiments, generally rectangular in shape and defines a pair of opposite side edges and a pair of opposite end edges which can be referred to as a leading end edge and a trailing end edge. The leading end edge of each wet wipe is typically positioned in the package to be grasped by a user to facilitate a removal of the wipe from the container.

Materials suitable for the wipes used in conjunction with particular embodiments of the present invention are well known to those skilled in the art. For wet wipes, these can be made from any material suitable for use as a moist wipe, including meltblown, coform, air-laid, bonded-carded web materials, hydroentangled materials, high wet-strength tissue, and the like, and can comprise synthetic or natural fibers, or combinations thereof. The wipes of the different aspects of the present invention can contain a liquid which can be any solution which can be absorbed into the wipes, thus making them "wet wipes." The liquid contained within the wet wipes can include any suitable components which provide the desired wiping properties. Examples of such components are water, emollients, surfactants, preservatives, chelating agents, pH buffers, fragrances, or combinations thereof.

Thus, particular embodiments of the present invention provide a package that is substantially moisture impervious so as to be suitable to store wet wipes, can function as a dispenser, is aesthetically pleasing, and can utilize gusset-style bag packaging equipment. While the invention has been described in detail with respect to the specific aspects thereof, it will be appreciated that those skilled in the art, upon attaining an understanding of the foregoing, may readily conceive of alterations to, variations of, and equivalents to these aspects.

What is claimed is:

1. A package of moist wipes, the package comprising a flexible film sheet surrounding the moist wipes, the flexible film sheet defining an inner surface and an outer surface,
the package having a generally parallelepiped shape, the package having a first side wall opposite a second side wall, a front wall opposite a back wall, and a top wall opposite a bottom wall, each wall formed from the flexible film sheet,
wherein the flexible film sheet is bonded to itself along opposite first and second side seams to form the first and second side walls, respectively;
wherein the top wall is tucked toward the bottom wall adjacent the first and second side walls to define first and second gusset portions, respectively;
wherein the first and second gusset portions are held in place by the first and second side seams, respectively, via first and second W-fold bonded regions, respectively, wherein each W-fold bonded region comprises an outer-surface-to-outer-surface gusset bond sandwiched between two inner-surface-to-inner-surface gusset bonds, wherein a region of each side seam that is below the respective gusset portion comprises an inner-surface-to-inner-surface side bond, wherein each of said bonds is an energy bond, the flexible film sheet being substantially water-vapor impervious.

2. The package of claim 1, wherein the flexible film sheet is bonded to itself along a bottom seam to form the bottom wall, at least a portion of the bottom seam comprising an inner-surface-to-inner-surface bond.

3. The package of claim 2, wherein at least a portion of the bottom seam includes an outer-surface-to-outer-surface bond, and wherein the outer-surface-to-outer-surface bond of the bottom seam is sandwiched between two inner-surface-to-inner-surface bottom seam bonds.

4. The package of claim 1, wherein the top wall includes a line of weakness that defines a removable film portion.

5. The package of claim 4, wherein the line of weakness comprises a plurality of score lines that penetrate a depth that is less than a thickness of the flexible film sheet.

6. The package of claim 1, wherein the top wall includes a rigid flip top assembly adapted to cover a dispensing orifice, the assembly comprising a rigid ring affixed to the flexible film sheet, and a lid hingedly attached to the rigid ring.

7. The package of claim 1, wherein the flexible film sheet comprises a middle layer made of a first polymer sandwiched between top and bottom layers made of a second polymer that is different than the first polymer.

8. The package of claim 7, wherein the first polymer is high-density polyethylene, and wherein the second polymer is low-density polyethylene.

9. A package of moist wipes, the package comprising a flexible film sheet surrounding the moist wipes, the flexible film sheet defining an inner surface and an outer surface, the package having a generally parallelepiped shape, the package having a first side wall opposite a second side wall, a front wall opposite a back wall, and a top wall opposite a bottom wall, each wall formed from the flexible film sheet, wherein the top wall has a plurality of score lines that penetrate a depth that is less than a thickness of the flexible film sheet and define a removable film portion;

wherein the flexible film sheet is bonded to itself along a first side seam to form the first side wall, and bonded to itself along a second side seam to form the second side wall, wherein the top wall is tucked toward the bottom wall adjacent the first side wall to define a first gusset portion, and wherein the top wall is tucked toward the bottom wall adjacent the second side wall to define a second gusset portion, where the first gusset portion is held in place by the first side seam via a first W-fold bonded region that comprises an outer-surface-to-outer-surface bond sandwiched between two inner-surface-to-inner-surface bonds, wherein a region of the first side seam that is below the first gusset portion comprises an inner-surface-to-inner-surface bond, where the second gusset portion is held in place by the second side seam via a second W-fold bonded region that comprises an outer-surface-to-outer-surface bond sandwiched between two inner-surface-to-inner-surface bonds, wherein a region of the second side seam that is below the second gusset portion comprises an inner-surface-to-inner-surface bond, wherein each of said bonds is an energy bond, the flexible film sheet being substantially water-vapor impervious.

10. The package of claim 9, wherein the flexible film sheet is bonded to itself along a bottom seam to form the bottom wall, at least a portion of the bottom seam comprising an inner-surface-to-inner-surface bond.

11. The package of claim 10, wherein at least a portion of the bottom seam includes an outer-surface-to-outer-surface bond, and wherein the outer-surface-to-outer-surface bond of the bottom seam is sandwiched between two inner-surface-to-inner-surface bottom seam bonds.

12. The package of claim 9, wherein the top wall includes a rigid flip top assembly adapted to cover a dispensing orifice, the assembly comprising a rigid ring affixed to the flexible film sheet, and a lid hingedly attached to the rigid ring.

13. The package of claim 9, wherein the flexible film sheet comprises a middle layer made of a high-density polyethylene sandwiched between top and bottom layers made of a low-density polyethylene.

14. The package of claim 9, wherein the flexible film sheet has a Water Vapor Transmission Rate of less than two grams per square inch per day.

* * * * *